US009623595B2

(12) United States Patent
Kurihara

(10) Patent No.: US 9,623,595 B2
(45) Date of Patent: Apr. 18, 2017

(54) FUNCTIONAL RESIN AND MANUFACTURING METHOD THEREFOR

(71) Applicant: NATIONAL INSTITUTE OF ADVANCED INDUSTRIAL SCIENCE AND TECHNOLOGY, Chiyoda-ku (JP)

(72) Inventor: Kazuma Kurihara, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 153 days.

(21) Appl. No.: 14/402,796

(22) PCT Filed: May 24, 2013

(86) PCT No.: PCT/JP2013/064520
§ 371 (c)(1),
(2) Date: Nov. 21, 2014

(87) PCT Pub. No.: WO2013/176267
PCT Pub. Date: Nov. 28, 2013

(65) Prior Publication Data
US 2015/0151470 A1      Jun. 4, 2015

(30) Foreign Application Priority Data

May 25, 2012   (JP) ................................ 2012-119907

(51) Int. Cl.
C08J 9/26       (2006.01)
B29C 45/17      (2006.01)
B29C 45/00      (2006.01)
B29L 7/00       (2006.01)

(52) U.S. Cl.
CPC ...... *B29C 45/1701* (2013.01); *B29C 45/0001* (2013.01); *B29C 45/0053* (2013.01); *C08J 9/26* (2013.01); *B29C 2045/0058* (2013.01); *B29C 2045/1702* (2013.01); *B29L 2007/001* (2013.01); *C08J 2201/0422* (2013.01); *C08J 2201/0462* (2013.01); *C08J 2323/06* (2013.01); *C08J 2345/00* (2013.01); *C08J 2357/00* (2013.01); *C08J 2469/00* (2013.01)

(58) Field of Classification Search
CPC ............ B29C 45/0001; B29C 45/0053; B29C 45/1701; B29C 2045/0058; B29C 2045/1702; C08J 9/26; C08J 2201/0422; C08J 2201/0462; C08J 2323/06; C08J 2345/00; C08J 2357/00; C08J 2469/00; B29L 2007/001
See application file for complete search history.

(56) References Cited

U.S. PATENT DOCUMENTS 3,783,093 A * 1/1974 Gallagher ............ A61L 15/225
                                                              156/77
2010/0036009 A1   2/2010  Konishi et al.
2010/0055397 A1   3/2010  Kurihara et al.
2010/0151188 A1   6/2010  Ishizuka et al.
2011/0003069 A1   1/2011  Ho et al.
2012/0252912 A1  10/2012  Konishi et al.

FOREIGN PATENT DOCUMENTS

| CA | 2 811 651 A1 | 4/2012 |
| CN | 101583657 A | 11/2009 |
| EP | 1 512 725 A1 | 3/2005 |
| EP | 2 623 549 A1 | 8/2013 |
| JP | 06-116430 | 4/1994 |
| JP | 2000-237678 A | 9/2000 |
| JP | 2001-212966 A | 8/2001 |
| JP | 2007-077201 A | 3/2007 |
| JP | 2007-160524 A | 6/2007 |
| JP | 2008-111139 A | 5/2008 |
| JP | 2008-143162 A | 6/2008 |
| JP | 2010-142881 A | 7/2010 |
| JP | 2011-116821 A | 6/2011 |
| WO | WO-2012/043347 A1 | 4/2012 |

OTHER PUBLICATIONS

Office Action in Chinese Application No. 201380027341.1 dated Feb. 24, 2016, 19 pages.
Search Report in Application No. PCT/JP2013/064520 dated Sep. 3, 2013.
Ruzette et al., "Block Copolymers in Tomorrow's Plastics", Nature Materials, vol. 4, 2005, pp. 19-32.
Extended European Search Report in EP Application No. 13793105.1 dated Jan. 18, 2016, 8 pages.
International Preliminary Report on Patentability in Application No. PCT/JP2013/064520 dated Nov. 25, 2014.

* cited by examiner

*Primary Examiner* — Irina S Zemel
(74) *Attorney, Agent, or Firm* — Marshall, Gerstein & Borun LLP

(57) ABSTRACT

A resin product wherein a resin B has pillar structures or lamellar structures inside a resin A is molded by kneading the resin A and the resin B that serves as a base material in an injection molding machine while heating both of the resins to at least a temperature at which both of the resins are melted at least partially. The resin product is soaked in a solution having higher erosion capability with respect to the resin A than the resin B, thereby dissolving the resin B and forming an uneven structure on the surface. As a result, an uneven structure having various shapes, densities or depths which are precisely adjustable can be formed at low cost. And provided are a resin structure and a production method thereof that can maintain wettability control or optical property control of the molded article over a long period of time.

1 Claim, 7 Drawing Sheets

HDPE(HJ580)+ KURARAY PMMA(HR100LC)
70:30

|  | FLAT PLATE | NANO |
|---|---|---|
| AFTER MOULDING (WITHOUT TREATMENT) | 97.7 | 122.5 |
| AFTER SOLUTION TREATMENT | 77.3 | 78.0 |

COC(5013L-10)+ IUPILON (S-3000R)
70:30

|  | FLAT PLATE | NANO PLATE |
|---|---|---|
| AFTER MOULDING (WITHOUT TREATMENT) | 98.6 | 110.7 |
| AFTER SOLUTION TREATMENT | 73.2 | 75.6 |

Fig.6

FUNCTIONAL RESIN AND MANUFACTURING METHOD THEREFOR

TECHNICAL FIELD

The present invention relates to a functional resin and a production method thereof, and specifically relates to a functional resin which exhibits improved antifouling properties, hydrophilicity and adhesion and improved light transmittance or improved texture by having porous structures particularly from the surface of the resin such as plastics to the inside thereof.

BACKGROUND ART

The technique for controlling wettability such as hydrophilicity or water repellency on the surface of resin is required for materials of functional resin products in various technical fields in order to control antifouling properties, flow channels of droplets, antifogging properties or the like.

Particularly many resins such as polycarbonate resins, acrylic resins, high density polyethylenes, polypropylenes, low density polyethylenes, Zeonex and polyethylenes exhibit water repellency for pure water, and therefore imparting hydrophilicity to the resin surface is important during development thereof for applications such as medical test devices, biochips, components for food applications, components for automobiles, components for agricultural applications and components for bathrooms in order to improve functionalities of the resins for the applications.

As the technique for imparting hydrophilicity to resin surface, a method has been conventionally known in which a surfactant having a hydrophilic group such as glycerine fatty acid ester monoglycerides, glycerine fatty acid esters, polyglycerine fatty acid esters, sorbitan fatty acid esters, polyoxyethylene ethylene oxide adducts and dinonylnaphthylsulphonic acid is added to the resin to enrich the resin surface with a hydrophilic group component, thereby imparting hydrophilicity. A method is also known, as disclosed in Patent Literature 1, in which electrons are allowed to collide with resin surface by corona treatment or plasma treatment to generate polar groups (OH groups and carbonyl groups) on the resin surface to impart hydrophilicity to the resin surface.

Alternatively Patent Literatures 2 to 4 disclose formation of recessions and protrusions on the surface of molded articles for utilizing the resulting pinning effect to control wettability of droplets or formation of recessions and protrusions on the surface to improve hydrophilicity.

Furthermore Patent Literature 5 discloses mixing and dispersing a water repellent resin in a base polymer and selectively dissolving the base polymer on the surface to realize superhydrophobicity.

Patent Literature 6 discloses including aramid fine particles in a fluororesin composition, soaking some of the aramid fine particles in a solvent to allow dissolution thereof to form a plurality of pores on the surface, thereby improving adhesiveness and wear resistance.

Meanwhile the technique for controlling transmittance and reflectance of light, infrared radiation or electromagnetic waves of resin molded articles has been employed in various technical fields in order to improve transmittance of optical lenses, prevent flare or decorate and color design surfaces. Conventionally, optical properties of resin molded articles have been usually controlled by forming an optical multilayer film on the surface of a resin molded article in a dry or wet manner using a vacuum deposition device or a dip coater in order to improve the optical properties.

As disclosed in Patent Literature 7, a technique for improving optical properties by utilizing recessions and protrusions has been known in which recessions and protrusions are formed on the surface of a resin molded article with an interval of at or less than a wavelength in order to, on the basis of a recession and protrusion structure, utilize the effect of interference of light, infrared radiation or electromagnetic waves, and control the transmittance or reflectance.

Patent Literature 1: Japanese Patent Application Laid-open No. 2007-160524

Patent Literature 2: Japanese Patent Application Laid-open No. H6-116430

Patent Literature 3: Japanese Patent Application Laid-open No. 2000-237678

Patent Literature 4: Japanese Patent Application Laid-open No. 2001-212966

Patent Literature 5: Japanese Patent Application Laid-open No. 2007-77201

Patent Literature 6: Japanese Patent Application Laid-open No. 2011-116821

Patent Literature 7: Japanese Patent Application Laid-open No. 2008-143162

DISCLOSURE OF THE INVENTION

The technique for controlling wettability such as hydrophilicity or water repellency by adding surfactants having hydrophilic groups is to impart hydrophilicity to resins by means of seeping of surfactants having hydrophilic groups. However it is unsatisfactory because hydrophilicity is eliminated when the additive is depleted from the inside of the resin and the effect may not be sufficiently manifested depending on the type of the resin added.

Further the method of imparting hydrophilicity by corona treatment or plasma treatment is, although it is advantageous in that it can provide preferable hydrophilicity, high in cost and cannot maintain hydrophilic function over a long period of time because of elimination of polar groups.

Meanwhile controlling wettability by means of recessions and protrusions is advantageous in that wettability can be maintained over a long period of time because the inherent recession and protrusion structures are to control wettability such as hydrophilicity and water repellency. However it requires a mold for formation of recessions and protrusions and recessions and protrusions may not be provided all the time because of the shape of molded articles. In addition, because a mold having minute recessions and protrusions is required, the production cost is high, and when a molded article having a complex shape is required, the cost for production of the mold having recessions and protrusions is dramatically increased.

In addition the techniques disclosed in Patent Literatures 5 and 6 are significantly affected by the content of the water repellent resin or the aramid fine particles relative to a base material, the shape or dispersion, so that the shape, density or depth of recessions and protrusions cannot be precisely adjusted to the values suitable for various applications.

Meanwhile with regard to the technique for controlling transmittance, reflectance or absorptance for light, infrared radiation or electromagnetic waves of resin molded articles, if the resin molded article can absorb light, infrared radiation or electromagnetic waves having a wavelength of interest, sufficient optical properties cannot be obtained only by an improvement in transmittance and a reduction in reflectance by means of the effect of surface interference. Namely in order to improve absorptive characteristics of resin for light, infrared radiation or electromagnetic waves having a wavelength of interest, reducing the thickness of the resin molded article to reduce the attenuation is effective. However, the required strength cannot be secured because the molded article has reduced strength associated with reduction in thickness, posing a limitation to this technique.

Thus an object of the present invention is to allow mass production of a functional resin having porous structures from the surface to the inside that are optimal for required application including strength at low cost using a conventional injection molding technique. It is also an object of the present invention to provide a functional resin and a production method thereof that can maintain desired wettability such as hydrophilicity and water repellency and adhesiveness as well as desired transmittance and reflectance properties for light rays, electromagnetic waves or the like over a long period of time.

In order to solve the above problems, a resin product of the present invention is molded by kneading a resin A and a resin B that serves as a base material in an injection molding machine while heating both of the resins to at least a temperature at which both of the resins are melted at least partially, such that the resin A has pillar structures or lamellar structures (layered structures) inside the resin B, and the resin product is soaked in a solution having higher erosion capability with respect to the resin A than the resin B, thereby dissolving the resin A from the surface to the inside and forming porous structures.

In order to produce a resin, a method for producing a functional resin of the present invention includes a first step of charging a resin A and a resin B into an injection molding machine, a second step of kneading the resin A and the resin B in the injection molding machine while both of the resin A and resin B are melted at least partially, a third step of cooling a kneaded product of the resin A and resin B recovered from the injection molding machine to form the resin A having pillar structures or lamellar structures in the resin B and a fourth step of soaking the kneaded product in a solution having higher erosion capability with respect to the resin A than the resin B, thereby dissolving the resin A having pillar structures or lamellar structures from the surface and forming recessions and protrusions on the surface of the kneaded product.

In the third step, three dimensional recession and protrusion structures may be formed using a mold core having minute recessions and protrusions on the surface thereof, thereby adjusting the shape, density and depth of the resin A to be dissolved in the fourth step.

Further the shape and density of lamellar structures formed in the third step and the depth of erosion of the resin A from the surface to the inside may be adjusted by selecting the combination of the resin A, resin B and the solution, the heating temperature of the injection molding machine and kneading time in the second step or at least one or both of the soaking time and temperature of the solution in the fourth step.

According to the present invention, a molded article having a complex shape such as a cylindrical shape can be obtained that has improved hydrophilicity and adhesiveness. For example the hydrophilicity of the surface of resin can be improved during development of the resin for various applications such as test devices with biochips, medical test devices, components for food applications, components for automobiles, components for agricultural applications and components for bathrooms.

In addition, according to the present invention, a molded article having a complex shape such as a cylindrical shape or an optical lens shape can be obtained that has reduced absorption of light, infrared radiation, electromagnetic waves or the like. For example a functional resin molded article can be obtained that has optimally adjusted light transmittance, infrared radiation transmittance or electromagnetic wave transmittance according to application thereof during development of the molded article for various applications such as optical lenses or covers.

Further, a functional resin molded article can be realized that has a secured field of vision all the time by exhibiting desired water repellency or hydrophilicity under the atmosphere of rain or where liquid such as water or oil is used. It is also possible to obtain a preferable functional molded article such as a lens or cover by imparting desired light transmittance or the like.

BRIEF DESCRIPTION OF THE DRAWINGS

FIG. 6 is a view illustrating actual production examples; and

BEST MODE FOR CARRYING OUT THE INVENTION

Figure 1:
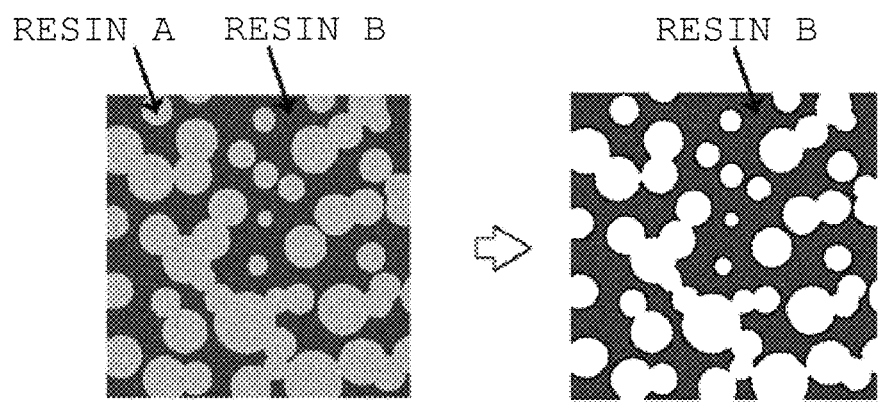
FIG. 1 is a view illustrating the basic principle of the present invention.
Figure 2:
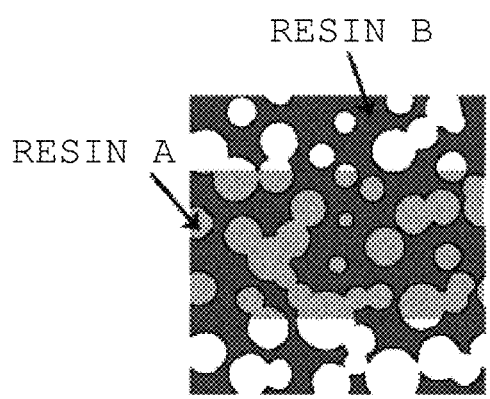
FIG. 2 is a view illustrating the state where only the resin B partially exists.

The basic principle of the present invention is first of all illustrated by referring to FIG. 1.

A resin A is mixed with a resin B that serves as a base material and kneaded in an injection molding machine while heating both resins to a temperature at which both resins A and B are melted at least partially. After kneading under the predetermined conditions, the resins are cooled to form a molded article which contains the resin A in the shape of a pillar such as a cylinder or the shape of a lamella in the resin B that serves as a base material and being in the state of phase separation from the resin B. The molded article is then soaked in, particularly, a solution having high solubility of the resin A to remove the continuous area along the pillar shape or the lamellar shape formed with the resin A from the surface of the molded article, thereby allowing formation of porous structures and provision of the molded article having three dimensional recessions and protrusions formed with the residual resin B and the removed resin A.

In addition, according to the present invention, a molded article having a complex shape such as a cylindrical shape or an optical lens shape can be obtained that has reduced absorption of light, infrared radiation, electromagnetic waves or the like. For example a functional resin molded article can be obtained that has optimally adjusted light transmittance, infrared radiation transmittance or electromagnetic wave transmittance according to application thereof during development of the molded article for various applications such as optical lenses or covers.

Further, a functional resin molded article can be realized that has a secured field of vision all the time by exhibiting desired water repellency or hydrophilicity under the atmosphere of rain or where liquid such as water or oil is used. It is also possible to obtain a preferable functional molded article such as a lens or cover by imparting desired light transmittance or the like.

Figure 3:
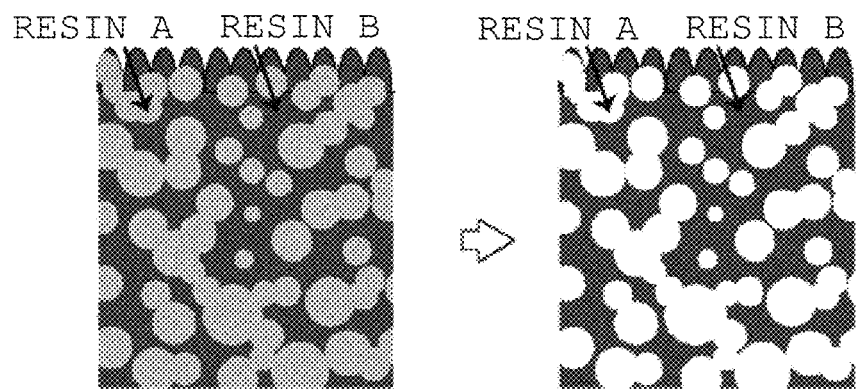
FIG. 3 is a view illustrating the state where all the resin A contacting the interface between the solution is dissolved.

FIG. 3 illustrates the state where after injection molding using a mold core having nanoscale recessions and protrusions as described hereinbelow, all the resin A contacting the interface between the solution is dissolved.

It is now specifically described how a desired embodiment such as the shape, density or depth of three dimensional recessions and protrusions is obtained.

As described hereinbelow, upon production of a functional resin of the present invention, the resin A and the resin B in the form of pellets are charged in a hopper at a predetermined proportion and both resins are mixed while melting by shear heat in a cylinder of an injection molding machine 1.

In the cylinder of the injection molding machine 1, both resins are melted, sheared while kneading and cooled to normal temperature after a predetermined period of time through the injection molding machine 1.

On this occasion, the solidified resin A having various cross-sectional shapes in the form of a pillar or a lamella of a predetermined length is phase-separated so as to be dispersed in the resin B that serves as a base material.

Thereafter the product is soaked in a solution that selectively dissolves the resin A dispersed on the surface to dissolve the resin A along the structures phase-separated from the resin B and form recessions and protrusions formed by the dissolved resin A on the surface of the resin B that serves as a base material. The solution selected may be the one that has no erosion capability with respect to the resin B or may be the one that may partially dissolve the resin B. In other words, the solution may be the one that has higher solubility of the resin A than of the resin B in order to form desired recessions and protrusions with the residual resin B.

The embodiments of the formed recessions and protrusions and the related conditions are hereinafter organized.

With regard to the selection of the materials for the resin A and the resin B, it is necessary that each resin is melted at least partially at a heating temperature in an injection molding machine. Thereby the resin A and the resin B are melted in a cylinder and kneaded by a screw.

It is also an essential condition that when the kneaded resins are cooled to a temperature at or lower than a glass transition temperature of the resin A or the resin B, the resin A having a predetermined size and shape is phase-separated from the resin B that serves as a base material while both resins are intricately mixed. By satisfying the conditions, the shape of the resin A formed in the resin B that serves as a base material can be altered from spherical to pillar or lamellar according to the mixing ratio between the resin A and the resin B.

The solution having high solubility of the resin A can erode and dissolve along the thus formed pillar shape or lamellar shape to form three dimensional structures having the resin B that serves as a base material remaining on the surface.

On the other hand, when the resin A has a higher melting temperature than the resin B or an inorganic material is admixed, the resin A adheres around the resin B or the inorganic material and thus pillar structures or lamellar structures cannot be formed. Therefore a solution that dissolves only the resin A dissolves the resin A while forming spherical structures and thus does not allow production of three dimensional structures having high aspect ratio and high density of recessions and protrusions.

When the resin A has a melting temperature at or lower than that of the resin B, the resin B adheres around the resin A, and thus the resin A cannot be dissolved when the article is soaked in a solution that dissolves only the resin A because the resin A is coated by the resin B. In this case as well, pillar structures or lamellar structures cannot be formed but spherical structures are formed, and three dimensional structures having high aspect ratio cannot be obtained.

Thus unless both the resin A and the resin B are at or above a softening point, preferable pillar structures or lamellar structures cannot be formed, or hydrophilicity and water repellency cannot be preferably controlled or the light absorptance, infrared radiation absorptance or electromagnetic wave absorptance cannot be reduced by reducing the density of the resin.

Therefore it is necessary to heat to at or above a softening point at which both the resin A and the resin B are partially melted.

As far as the resin A and the resin B are at or above the softening point, similar effect can be obtained even when another additive is admixed regardless of an organic or inorganic material such as a resin C or a resin D.

Under the above-mentioned conditions, the conditions such as selection of a solution in which a molded article containing the resin A and the resin B having minute pillar structures or lamellar structures finely phase-separated is soaked and soaking time are preferably the one under which only the resin A is dissolved and the resin B is not eroded. However, the embodiment in which the resin A is mainly dissolved and the resin B is partially dissolved also allows preparation of the present structures.

In this case, the difference in the degree of solubility between the resin A and the resin B in the solution is preferably high. However, the structures can be prepared without problem when the difference in the degree of solubility is 5 or more.

When the soaking time is long, all the resin A at the surface can be dissolved along pillar structures or lamellar structures, allowing further complicated cylindrical structures or lamellar structures having high aspect ratio being formed.

When the soaking time is short, some of the structures of the resin A may remain on the surface, allowing structures having low aspect ratio and high gas barrier properties to be formed.

The thus prepared functional resin having recessions and protrusions may be applied to, when water repellency or hydrophilicity is desired to be controlled, medial test devices or various components such as plates and utensils, films for agricultural applications, films for food applications, films for medical applications, films for bathrooms and window glass.

Further it is possible to use a mold having wrinkles or a mold having nanoscale recessions and protrusions for molding to form wrinkled recessions and protrusions or nanoscale recessions and protrusions on the surface layer of the molded article. This technique may be combined with the present invention in order to further improve the properties.

As described above, in order to obtain desired hydrophilicity for example, the time of soaking of a molded article containing the resin A phase-separated from the resin B in a solution may be the one that allows dissolution of the resin A at the surface layer to a desired depth. For example when the resin A is a high density polyethylene, the resin B is a polycarbonate and a solvent is acetone, desired hydrophilicity can be obtained in around 15 minutes.

Figure 4:
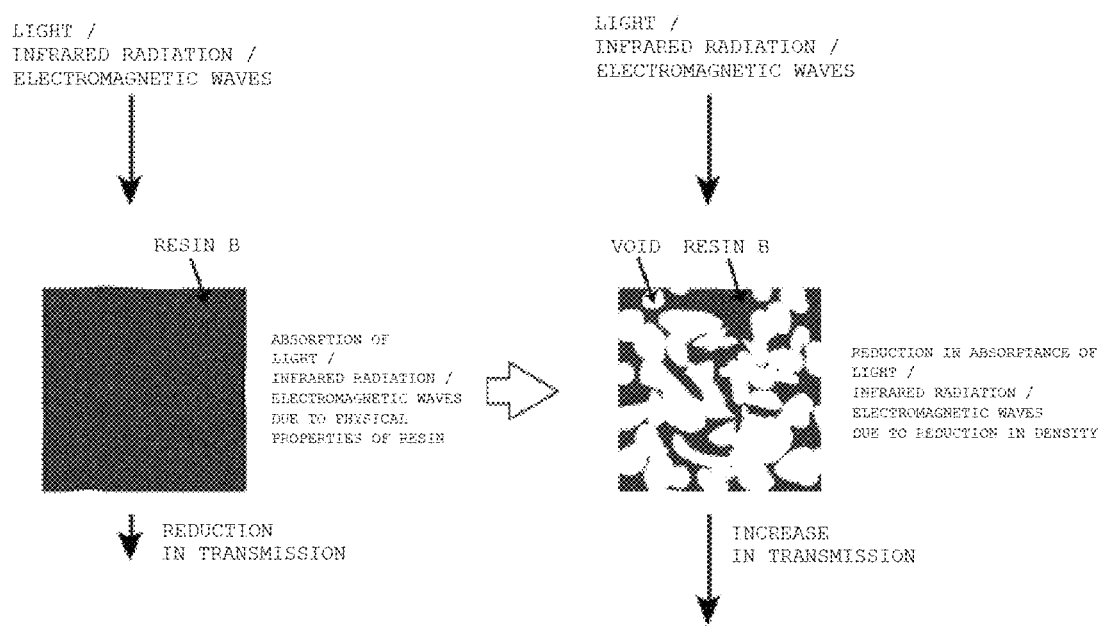
FIG. 4 is a view illustrating an example where the absorptance is decreased and the transmittance is increased for light, infrared radiation or electromagnetic waves having a wavelength of interest.

When a resin absorbs light, infrared radiation or electromagnetic waves having a wavelength of interest, the density of the resin forming a molded article can be decreased by the present method as shown in FIG. 4. When the average interval between three dimensional structures formed in a molded article is controlled so as to be at or less than a wavelength of interest, incident light, infrared radiation or electromagnetic waves are scattered in the article and are not externally scattered. Therefore the resin can have a reduced light absorptance, infrared radiation absorptance or electromagnetic wave absorptance and the molded article can have an improved transmittance.

In this case, soaking is carried out for a few hours to a few days in order to dissolve the resin A along pillar structures or lamellar structures across the whole region along the thickness direction of the resin molded article and to obtain a desired transmittance. However, when a decrease in the strength of the molded article per se by dissolving the resin A is a concern, it is required to reduce the proportion of the resin A and to select the weight ratio between the resins A and B, the kneading conditions thereof, the solution or the soaking time so that pillar structures or lamellar structures extend along the thickness direction.

On the other hand, when a light having a wavelength shorter than the interval between three dimensional structures is entered, scattering occurs. Therefore the article may serve as, for example, a filter that intercepts a light having a wavelength shorter than the interval between three dimensional structures while transmitting a light having a wavelength longer than the interval. In addition because the resin molded article internally has pillar structures or lamellar structures, the molded article may have dramatically increased strength by selecting suitable conditions compared to a molded article having an equivalent transmittance by decreasing the thickness of the article. Further it is possible to use a mold having wrinkles or a mold having nanoscale recessions and protrusions for molding to form wrinkled recessions and protrusions or nanoscale recessions and protrusions on the surface layer of the molded article. This technique may be combined with the present invention in order to further improve transmission properties.

The production method is specifically illustrated in FIGS. 5(a) to 5(g).

The resin B selected is a high density polyethylene (HDPE), a low density polyethylene (LDPE), a polypropylene (PP) or the like, as shown in FIG. 5(a), the resin A selected is, for example, an acrylic resin or a polycarbonate resin that can be dissolved in a solvent such as acetone and is weighed and mixed with the resin B. As shown in FIG. 5(b), the resins are heated in a pelletizer or a cylinder to at or above a softening point of the resins, and two or more resins are mixed and injected into a mold.

Figure 5:
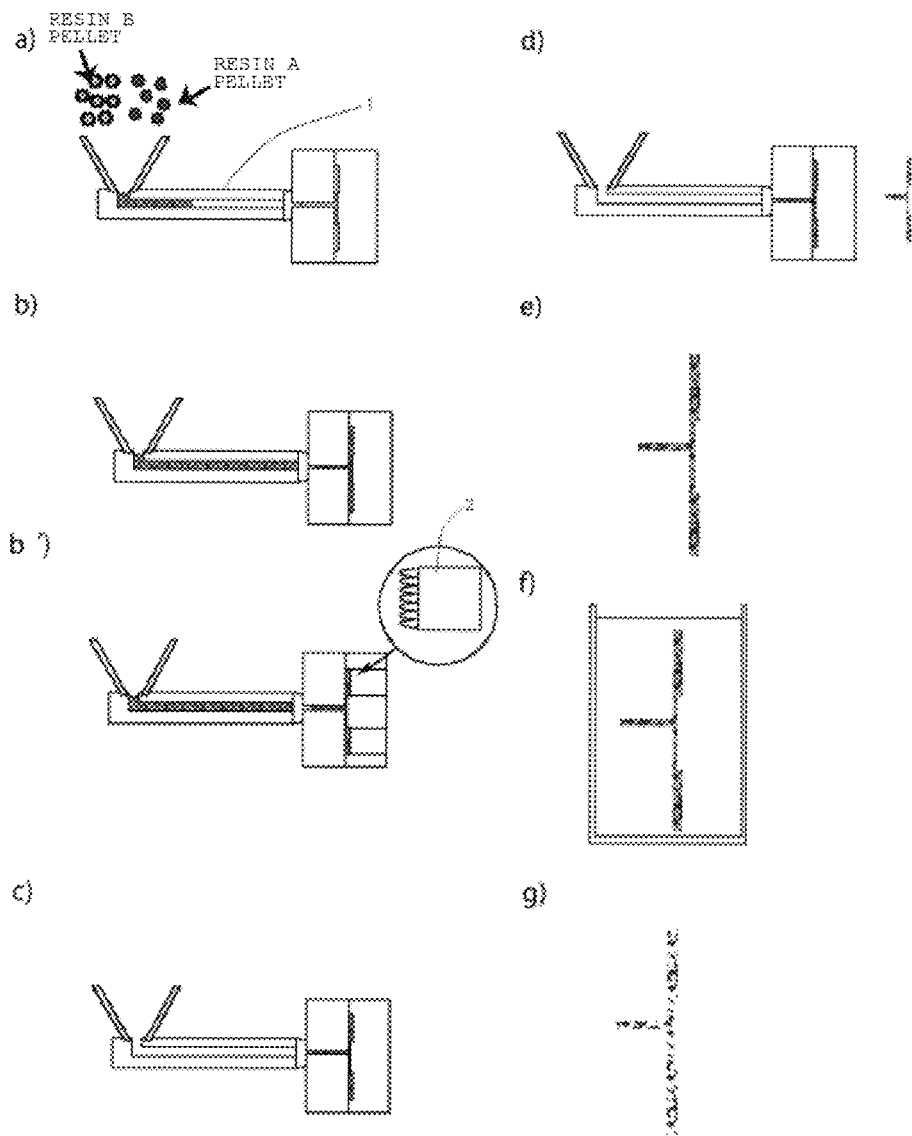
FIGS. 5(a) to 5(g) are views illustrating production procedures.

FIG. 5(b') shows the instance where a mold 2 having nanoscale recessions and protrusions is used.

By carrying out injection molding in case of thermoplastic resins (in case of thermosetting resins, transfer molding or in-mold press), a molded article is formed that contains the resin A mixed in the resin B that serves as a base material while being phase-separated from the resin B.

As shown in FIG. 5(c), the resins are cooled and solidified in the mold to form a molded article which is then recovered from the mold. Thereby as shown in FIGS. 5(d) and 5(e), the molded article is prepared that contains the resin A forming pillar structures or lamellar structures and is phase-separated in the base material resin B.

When a high density polyethylene and an acrylic resin are used, a mixed resin molded article is formed in which the high density polyethylene and the acrylic resin are in the state of phase separation and which has pillar structures or lamellar structures.

Thereafter as shown in FIG. 5(f), the molded article is dipped in a solution (e.g. acetone) that is insoluble for the resin B (e.g. a high density polyethylene) and soluble for the resin A (e.g. an acrylic), thereby preparing a high density polyethylene molded article having three dimensional recession and protrusion structures as shown in FIG. 5(g).

The structures of three dimensional recessions and protrusions are hole structures of about 100 nm to 10 μm, are three-dimensionally formed and can exhibit capillary action. Therefore the contact angle of the water repellent resin may be modified to be hydrophilic, thereby altering wettability.

Further when, as shown in FIG. 5(b'), a mold core having nanoscale recessions and protrusions is used during molding of a resin mixture of two or more resin structures to form a molded article having nanoscale recessions and protrusions on the surface thereof (and having resin structures of phase separation of two or more resins in the molded article) followed by dipping of the molded article in a solution that selectively dissolves only one of the resins to prepare a molded article having nanoscale recessions and protrusions as well as three dimensional recessions and protrusions, wettability can be further improved compared to the case where nanoscale recessions and protrusions are not formed. It is assumed that this effect is caused by linking of resin A having pillar structures or lamellar structures by means of nanoscale recessions and protrusions or an increase in the contact area to the solution.

When the interval between hole structures in three dimensional recession and protrusion structures is at or less than a wavelength of electromagnetic waves for which the transmittance is sought to be adjusted, scattering in the molded article can be suppressed and the density of the resin in the molded article can be decreased. As a result, the molded article can have a decreased absorptance of electromagnetic waves and an increased transmittance.

It is desirable that all the intervals between hole structures are at or less than the wavelength of electromagnetic waves of interest. However, this is not essential and hole structures may exist at a low proportion that have intervals at or more than the wavelength.

When the interval between hole structures is around 1 μm, a light having a wavelength in the visible light region can be attenuated and thus the transmittance of a light of the wavelength region (in this case, infrared radiation or the like) can be improved. By adjusting the interval between three dimensional structures, attenuation and transmission properties of a wavelength can be modified.

Further when, as shown in FIG. 5(b'), a mold core having nanoscale recessions and protrusions is used during molding of a resin mixture of two or more resin structures to form a molded article having nanoscale recessions and protrusions on the surface thereof (and having resin structures of phase separation of two or more resins in the molded article) followed by dipping of the molded article in a solution that selectively dissolves only one of the resins to prepare a molded article having nanoscale recessions and protrusions as well as three dimensional recessions and protrusions, transmittance can be further improved compared to the case there nanoscale recessions and protrusions are not formed.

More specific production examples are hereinafter illustrated.

A cycloolefin copolymer (COC) available from Polyplastics Co., Ltd. as a resin B that serves as a base material and a polycarbonate resin (PC) available from Mitsubishi Engineering-Plastics Corporation as a resin A are charged in a hopper at a certain proportion, and both resins are mixed while melting by shear heat in a cylinder of an injection molding machine and injected into a mold for injection molding.

After cooling, the mold was opened to obtain a resin molded article containing the cycloolefin copolymer and the polycarbonate resin in the state of phase separation. After the preparation, the molded article was soaked in acetone that is a solvent soluble for the polycarbonate resin and insoluble for the cycloolefin copolymer for 1 minute to remove only the polycarbonate resin.

By adjusting the soaking time or concentration on this occasion, the amount of the polycarbonate resin removed can be adjusted. By carrying out the procedures, a resin molded article having three dimensional recession and protrusion structures inside of the surface was prepared.

By carrying out molding using a mold core having nanoscale recessions and protrusions on the surface thereof on this occasion in the molding step, a resin molded article having nanoscale recessions and protrusions on the surface thereof and three dimensional recession and protrusion structures on an inner surface of the resin was prepared.

The nanoscale recessions and protrusions employed herein had an average interval between recessions and protrusions of 50 nm to 400 nm and an average height of 50 nm to 600 nm. The core having nanoscale recessions and protrusions was prepared according to the method disclosed in Japanese Patent Application Laid-open No. 2008-143162.

The upper table in FIG. 6 shows the result of contact angle evaluation using droplets of pure water of 1 μm with a molded article prepared as follows: the resins to be mixed were a high density polyethylene resin (HDPE (HJ580)) available from Japan Polyethylene Corporation as a resin B that serves as a base material and an acrylic resin (Kuraray PMMA (HR100LC)) available from Kuraray Co., Ltd. as a resin A. The resins were mixed. A molded article in which both resins were molded in the state of phase separation was dipped in an acetone solution to dissolve only the acrylic resin and obtain the molded article having three dimensional recession and protrusion structures of the high density polyethylene on the surface thereof.

A resin molded article in which the high density polyethylene resin and the acrylic resin were mixed had a contact angle of 97.7 degrees when it had a flat surface. A mixed resin molded article obtained with the above-mentioned mixed resins and having nanoscale recessions and protrusions on the surface thereof had a contact angle of 122.5 degrees.

In contrast, the molded article obtained by dipping in the acetone solution and forming three dimensional recession and protrusion structures of the high density polyethylene resin only on the surface area had a contact angle of 77.3 degrees when it had a flat surface that was decreased from 97.7 degrees. The mixed resin molded article having nanoscale recessions and protrusions on the surface thereof had a contact angle of 78 degrees that was decreased from 122.5 degrees. The nanoscale recessions and protrusions had an average pitch of 100 nm and a height of 200 nm.

The lower table in FIG. 6 shows the result of contact angle preparation using droplets of pure water of 1 μm with a resin surface developed as follows: a cycloolefin copolymer (COC (5013L-10)) and a polycarbonate resin (Iupilon (S-3000R)) were mixed at a ratio of 7:3 and a molded article having three dimensional recession and protrusion structures was obtained according to the present production method.

As apparent from the result, a resin molded article obtained by mixing the cycloolefin copolymer and the polycarbonate resin had a contact angle of 98.6 degrees when it had a flat surface. A mixed resin molded article having nanoscale recessions and protrusions formed on the surface thereof using a core having nanoscale recessions and protrusions had a contact angle of 110.7 degrees.

However, it was confirmed that the molded article obtained by dipping in the acetone solution and forming three dimensional recession and protrusion structures of the cycloolefin copolymer only on the surface area had a contact angle of 73.2 degrees when it had a flat surface that was decreased from 98.6 degrees.

The mixed resin molded article having nanoscale recessions and protrusions on the surface thereof had a contact angle of 75.6 degrees that was decreased from 110.7 degrees. The nanoscale recessions and protrusions had an average pitch of 100 nm and a height of 200 nm. It was also confirmed that by changing the mixing ratio, the incidence rate of the change in wettability could be controlled.

Further, in the similar manner as above, a HDPE (HJ580) was chosen as a resin B that serves as a base material and an ABS resin, a PC (polycarbonate), a PS (polystyrene) or a PMMA (HR100LC) was chosen as a resin A. In a similar manner, a Novatec PP MA3H available from Japan Polypropylene Corporation was chosen as a resin B that serves as a base material and an ABS resin, a PC (polycarbonate) or a PS (polystyrene) was chosen as a resin A.

For each combination of the resin B and the resin A, a resin molded article was prepared at each of 5 different weight ratios between the resin B and the resin A of 8:2, 6:4, 5:5, 4:6 and 2:8.

The soaking time of each resin molded article in acetone was 15 minutes or more and less than 30 minutes. After soaking, acetone was blown off with air and the molded article was primarily washed with ultrapure water and subjected for measurement of wettability.

As a result, in case when the resin B was the high density polyethylene resin (HDPE (HJ580)), excellent hydrophilicity could be obtained with the resin A selected being the PC or the PMMA (HR100LC) at the weight ratio of 5:5, 4:6 or 2:8.

When the resin B was the PP MA3H, excellent hydrophilicity could be obtained with the resin A selected being the PC at the weight ratio of 5:5, 4:6 or 2:8.

When each resin molded article of the same combination was soaked in acetone for 15 minutes or more and less than 30 minutes and allowed to dry for a few days, a certain extent of hydrophilicity was obtained only with the resin A being the PC for the resin B being either the HDPE (HJ580) or the PP MA3H and significant hydrophilicity could not be observed for other molded articles.

Figure 7:
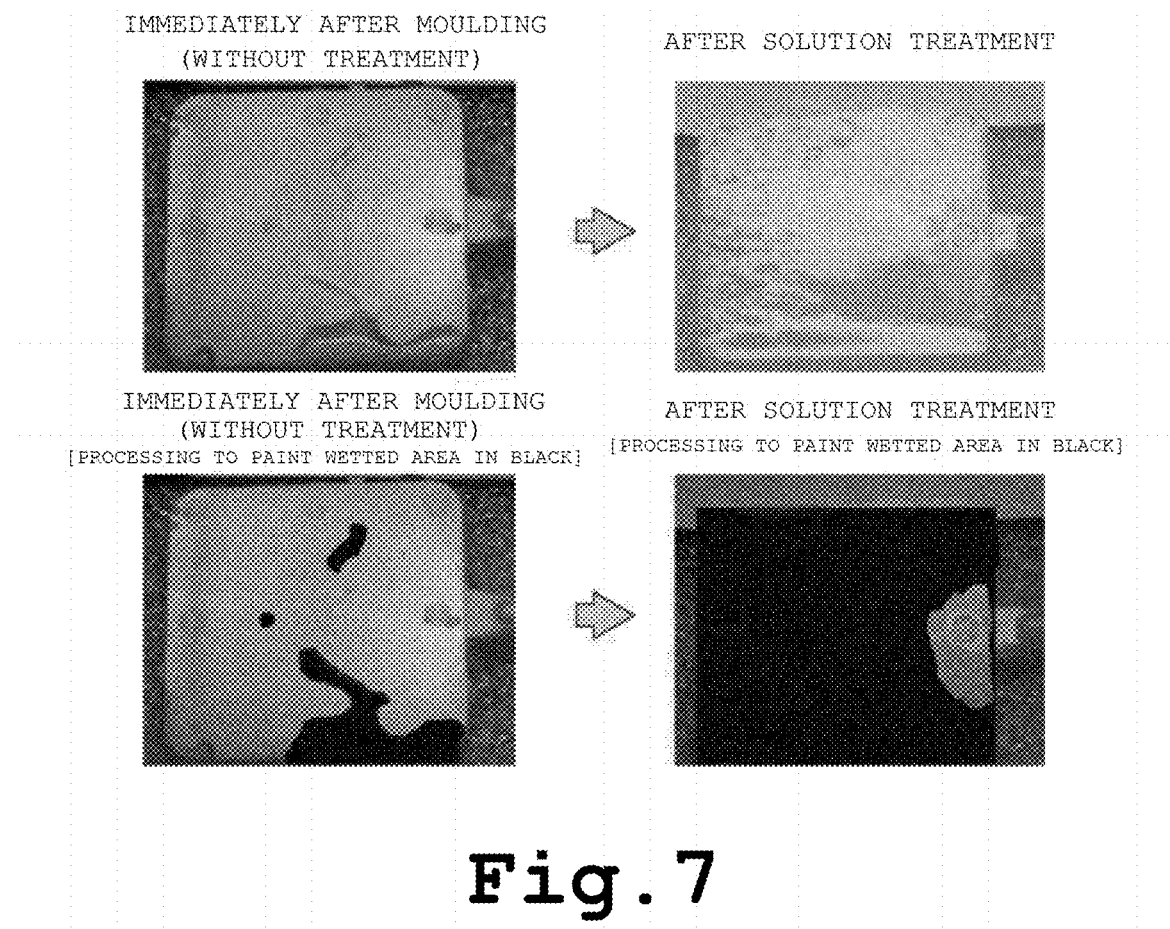
FIG. 7 is a view illustrating an experimental example showing the change in wettability between immediately after molding and after treatment with the solution.

FIG. 7 illustrates the result of wettability evaluation of molded articles according to the present invention.

The evaluation was carried out by spraying pure water and evaluating the extent of residual droplets (wettability).

The upper panel in FIG. 7 shows photographic images of the evaluation result. However, because it is difficult to observe the extent of residual droplets (wettability), the droplets immediately after molding (in case of without treatment) and the region of the liquid film after the treatment were painted black as shown in the lower panel of FIG. 7.

As apparent from the result, both molded articles having a flat surface and having nanoscale recessions and protrusions immediately after molding (in case of without treatment) had repellency of pure water. However both molded articles having three dimensional structures of the high density polyethylene resin only on the surface area did not repel pure water for both cases of having a flat surface and having nanoscale recessions and protrusions, demonstrating formation of a pure water film in a wide area.

In a different experiment, it was also confirmed that the molded article according to the present invention had a transmittance that was increased by 10% or more compared to the article obtained before dipping in the acetone solution because of decrease in light absorptance of the resin.

INDUSTRIAL APPLICABILITY

As described above, the present invention allows mass production at a low cost by using a conventional injection molding machine, precise adjustment of the shape, density or depth of the formed recessions and protrusions depending on application of the resin such as wettability of the surface of the resin and control of wettability and adjustment of transmittance of the molded article. Therefore it is expected that the present invention is widely applied to various applications such as tests with biochips, medical test devices, components for food applications, components for automobiles, components for agricultural applications, components for bathrooms, optical lenses and covers.

EXPLANATION OF REFERENCE NUMERALS

1 Injection molding machine
2 Mold core having nanoscale recessions and protrusions

The invention claimed is:

1. A method for producing a functional resin, the method comprising:

a first step of charging a resin A and a resin B into an injection molding machine;

a second step of kneading the resin A and the resin B in the injection molding machine while both of the resin A and the resin B are at least partially melted;

a third step of cooling a kneaded product of the resin A and the resin B and molding the kneaded product, thereby obtaining a molded article in which the resin A and the resin B are phase-separated and the resin A has pillar structures or lamellar structures; and a fourth step of soaking the molded article in a solution having a higher erosion capability with respect to the resin A than with respect to the resin B, thereby dissolving the resin A and forming porous structures in which a hole size is 100 nm to 10 μm, wherein the resin A is at least one resin selected from the group consisting of acrylic resins, ABS resins, polycarbonate resins, and polystyrene resins (PS); and the resin B is at least one resin selected from the group consisting of high density polyethylene (HDPE), low density polyethylene (LDPE), polypropylene (PP) and cycloolefin copolymers (COC), and wherein in the third step, three-dimensional recession and protrusion structures are formed on the molded article by using a mold core having minute recessions and protrusions on a surface thereof.

* * * * *